United States Patent
Das

(10) Patent No.: US 12,091,330 B2
(45) Date of Patent: Sep. 17, 2024

(54) APPARATUS AND PROCESS FOR REMOVING PFAS AND PFAS COMPOUNDS FROM WATER

(71) Applicant: Gautham Parangusa Das, Brookline, MA (US)

(72) Inventor: Gautham Parangusa Das, Brookline, MA (US)

(*) Notice: Subject to any disclaimer, the term of this patent is extended or adjusted under 35 U.S.C. 154(b) by 0 days.

(21) Appl. No.: 18/577,901

(22) PCT Filed: Mar. 17, 2023

(86) PCT No.: PCT/US2023/015576
§ 371 (c)(1),
(2) Date: Jan. 9, 2024

(87) PCT Pub. No.: WO2023/177909
PCT Pub. Date: Sep. 21, 2023

(65) Prior Publication Data
US 2024/0262717 A1    Aug. 8, 2024

Related U.S. Application Data

(60) Provisional application No. 63/320,975, filed on Mar. 17, 2022.

(51) Int. Cl.
| | |
|---|---|
| C02F 1/28 | (2023.01) |
| C02F 1/58 | (2023.01) |
| C02F 101/36 | (2006.01) |

(52) U.S. Cl.
CPC .............. *C02F 1/286* (2013.01); *C02F 1/583* (2013.01); *C02F 2101/36* (2013.01);
(Continued)

(58) Field of Classification Search
CPC ...... C02F 1/286; C02F 1/583; C02F 2101/36; C02F 2209/03; C02F 2209/40; C02F 2209/44
See application file for complete search history.

(56) References Cited

U.S. PATENT DOCUMENTS

| | | | |
|---|---|---|---|
| 3,327,859 A | 6/1967 | Pall | |
| 3,625,886 A | 12/1971 | Mattia | |

(Continued)

FOREIGN PATENT DOCUMENTS

| | | | |
|---|---|---|---|
| CN | 107055894 A | 8/2017 | |
| CN | 107253774 A | 10/2017 | |

(Continued)

OTHER PUBLICATIONS

KAF Construction Manual, Construction, Installation, Operation of Kanchan Arsenic Filter (KAF) Gem505 Version; Kanchan Arsenic Filter Local Entrepreneur's Training Workshop Jan. 16-20, 2006, 30 pgs.

(Continued)

*Primary Examiner* — John Kim
(74) *Attorney, Agent, or Firm* — Lowenstein Sandler LLP

(57) ABSTRACT

In certain embodiments, the present invention is directed to a process for decontaminating water to remove per- and polyfluoroalkyl substances (PFAS), the process comprising passing contaminated water through a filter comprising at least one filtering element, wherein the filtering element comprises organic fibers; wherein the decontaminated water has a PFAS level of less than 70 ppt.

2 Claims, 2 Drawing Sheets

(52) U.S. Cl.
CPC ...... *C02F 2209/03* (2013.01); *C02F 2209/40* (2013.01); *C02F 2209/44* (2013.01)

(56) References Cited

U.S. PATENT DOCUMENTS

| | | | |
|---|---|---|---|
| 4,133,754 | A | 1/1979 | Bory et al. |
| 4,664,812 | A | 5/1987 | Klein |
| 5,178,778 | A | 1/1993 | Sachse et al. |
| 5,320,663 | A | 6/1994 | Cunningham |
| 5,603,830 | A | 2/1997 | Everhart et al. |
| 5,907,925 | A | 6/1999 | Guyot |
| 5,928,588 | A | 7/1999 | Chen et al. |
| 6,821,427 | B2 | 11/2004 | Macpherson et al. |
| 6,821,433 | B2 | 11/2004 | Hokkirigawa et al. |
| 7,303,670 | B2 | 12/2007 | Mcphillips |
| 8,057,676 | B2 | 11/2011 | Yamasaki et al. |
| 8,088,279 | B2 | 1/2012 | Mcinnis et al. |
| 9,033,158 | B2 | 5/2015 | Yoshinobu et al. |
| 9,903,105 | B2 | 2/2018 | Tomberlin et al. |
| 11,413,558 | B1 | 8/2022 | Das |
| 2009/0050572 | A1 | 2/2009 | Mcguire et al. |
| 2012/0000847 | A1 | 1/2012 | Pola |
| 2013/0087503 | A1 | 4/2013 | Youngs et al. |
| 2016/0096746 | A1 | 4/2016 | Feng |
| 2016/0107898 | A1 | 4/2016 | Parekh et al. |
| 2018/0022620 | A1 | 1/2018 | Garg |
| 2018/0237315 | A1 | 8/2018 | Jeong |
| 2021/0339175 | A1 | 11/2021 | Strait, III |

FOREIGN PATENT DOCUMENTS

| | | |
|---|---|---|
| GB | 502962 A | 3/1939 |
| GB | 1082669 A | 9/1967 |
| JP | 2012-170950 A | 9/2012 |
| KR | 840001433 A | 5/1984 |
| KR | 101190282 B1 | 10/2012 |
| KR | 20130049909 A | 5/2013 |
| TW | 201417876 A | 5/2014 |
| WO | 97/06879 A1 | 2/1997 |

OTHER PUBLICATIONS

Jayalath et al., Burnt Clay Bricks as an Alternative Filter Media for Pebble Matrix Filters (PMF), Engineer, 2016, pp. 1-9, vol. XLIX, No. 3, Sri Lanka.

Ezeokonkwo et al., Preparation and Evaluation of Adsorbents from Coal and Irvingia gabonesis Seed Shell for the Removal of Cd(II) and Pb(II) Ions from Aqueous Solutions, Frontiers in Chemistry, Jan. 2018, pp. 1-14, vol. 5, Article 132.

Schmitt et al., "Rapid Sand Filtration", Environmental Information Management Civil Engineering Dept., Virginia Tech, 2018, 4 pgs.
CDC Centers for Disease and Prevention, Slow Sand Filtration, CDC, Mar. 21, 2012, 2 pgs.
Morin-Crini et al., "Hemp-Based Materials for Metal Removal", Green Adsorbents for Pollutant Removal, Aug. 2018, 18pgs., Springer.
"Biochar vs. Charcoal vs. Activated Carbon: What They Are & How They Work", CharGrow, 2018, 4 pgs.
Tramfloc, Inc., "More Than You Really Want to Know About Polymers", 2013, 15 pgs.
"Straw and Wood Waffles, Granite Seed and Erosion Control", Granite Seed Company, 2018, 4 pgs.
Citterio et al., "The arbuscular mycorrhizal fungus Glomus mosseae induces growth and metal accumulation changes in *Canabis sativa L.*", Chemosphere, Mar. 2005, pp. 21-29, Issue 1, vol. 59, Elsevier.
Daniels et al., "Practical Leachability and Sorption Considerations for Ash Management", American Society of Civil Engineers, Geo-Congress 2014 Technical Papers, Mar. 2014, pp. 362-376.
Grotenhermen, Franjo, "Medical Cannabis Congresses in Germany," Conference Reports, 1998, vol. 5, No. 2, 8 pgs.
Hanaor et al. "Scalable surface area characterization by electrokinetic analysis of complex anion adsorption", Langmuir, Nov. 2014, pp. 15143-15152, vol. 30, No. 50.
Kos et al., "Induced Phytoextraction/Soil Washing of Lead Using Biodegradable Chelate and Permeable Barriers", Environ. Sci. Technol., 2003, pp. 624-629, vol. 37, No. 3.
Linger et al., "Industrial hemp (*Cannabis sativa L.*) growing on heavy metal contaminated soil: fibre quality and phytoremediation potential", Industrial Crops and Products, 2002, pp. 33-42, vol. 16, No. 1, Elsevier.
Patel et al., "Crystallographic Characterization and Molecular Symmetry of Edestin, a Legumin from Hemp", Journal of Molecular Biology, 1994, pp. 361-363, vol. 235, Issue 1.
Rausch et al., "The 1995 Bioresource Hemp Symposium: an Overview", 1995, 15 pgs.
Wardlaw et al., "Diarrhoea: Why Children are Still Dying and What Can be Done", Unicef/WHO, 2009, 68 pgs.
Wirtshafter, Don "Why Hemp Seeds?", Bioresource Hemp Symposium, Frankfurt, Germany, 1995, 6 pgs.
Theimer et al., "Oils From *Cannabis sativa L.*—Valuable Food and Raw Materials for Pharmaceuticals and Other Industrial Products", Bioresource Hemp Symposium, 1997.
Who, Cholera Fact Sheet No. 107, Geneva: 2012 Contract No. 12, Aug. 2013.
Final Office Action received in U.S. Appl. No. 14/861,781 dated Jun. 28, 2018, 13 pgs.
Turner, et al., "Novel Remediation of Per-and Polyfluoroalkyl Substances (PFASs) From Contaminated Groundwater Using *Cannibis sativa L.* (hemp) Protein Powder", Chemosphere, Apr. 28, 2019, pp. 22-31, Vo. 229, Elsevier.
International Search Report and Written Opinion of International Application No. PCT/US2023/015576 mailed Jul. 6, 2023, 13 pgs.

though after a limited time. Hence drinking water treatment and respective GAC filtration need to be reconsidered as filter material in regard to PFASs.

APPARATUS AND PROCESS FOR REMOVING PFAS AND PFAS COMPOUNDS FROM WATER

CROSS REFERENCE TO RELATED APPLICATION

This application claims benefit from U.S. Provisional Patent Application Ser. No. 63/320,975 filed Mar. 17, 2022, which is hereby incorporated by reference herein in its entirety.

BACKGROUND OF THE INVENTION

PFAS or Polyfluoroalkyl substances are manmade compounds. Due to the excessive use of these compounds, they are found universally in the abiotic and biotic environment. Due to their unique physio-chemical properties, PFAS chemicals are present in various commercial products such as food packing textiles and in aqueous film forming foams (AFFFs) used for firefighting purpose.

PFAS has several half-lives which range from several years to decades in the human body. They are so extremely persistent that they are sometimes known as "forever chemicals." Health conditions such as high cholesterol and blood lipid levels, decreased fertility, and certain types of cancer have been linked to individuals exposed to PFASs. PFAS compounds have been detected in drinking water in North America and several European Union Nations as well. In 2016, the US EPA therefore recommended a health advisory limit of 70 ppt for sum of PFOS and PFOA in drinking water. The National Food Agency in Sweden recommends an action level of 90 parts per trillion (ppt) or the sum of 11 PFASs (i.e., C3eC9 perfluoroalkyl carboxylic acids (PFCAs): PFBA, PFPeA, PFHxA, PFHpA, PFOA, PFNA, PFDA; C4, C6, C8 perfluoroalkyl sulfonic acid (PFSAs): PFBS, PFHxS, PFOS; 6:2 fluorotelomer sulfonic acid: 6:2 FTSA) in drinking water and advises the level should be reduced as low as possible.

As awareness grows of the potential dangers of PFAS compounds in the environment, drinking water guidelines are becoming more stringent and additional recommendations are implemented on the acceptable daily intake (ADI). Wastewater treatment plants, municipal landfills, mono ash landfills, numerous industrial activities and fire training facilities are known sources of point source PFAS contamination, while surface runoff or precipitation can be considered as non-point sources of PFAS contamination. PFASs are extremely mobile in the water and if ingested pose a significant risk, and conventional drinking water treatment processes such as sand filtration, disinfection, etc., do not adequately remove the PFASs. The presence of PFASs in drinking water at concentrations greater than permissible limits requires the incorporation of new innovative treatment methods for drinking water treatment plants (DWTPs). Conventional methods such as ion exchange, nanofiltration, reverse osmosis and sand filtration with granulated activated carbon (GAC) are capable of removing PFASs to a certain extent. While adsorption to synthetic material like anion exchange resins remove PFAS to a certain extent, they are expensive to operate on large scale operations like DWTPs. Sand filtration with GAC is conventionally used in most DWTPs and has been effective for the removal of certain PFAS compounds; however, GAC needs to be replenished or replaced frequently hence it creates an additional waste stream. Furthermore short-chain PFASs (PFSAs with less than or equal to 6 carbons and PFCAs with less than or equal to 7) break through rapidly and even long-chain PFASs break through after a limited time. Hence drinking water treatment and respective GAC filtration need to be reconsidered as filter material in regard to PFASs.

All references disclosed herein are hereby incorporated by reference in their entireties for all purposes.

SUMMARY OF THE INVENTION

Figure 1:
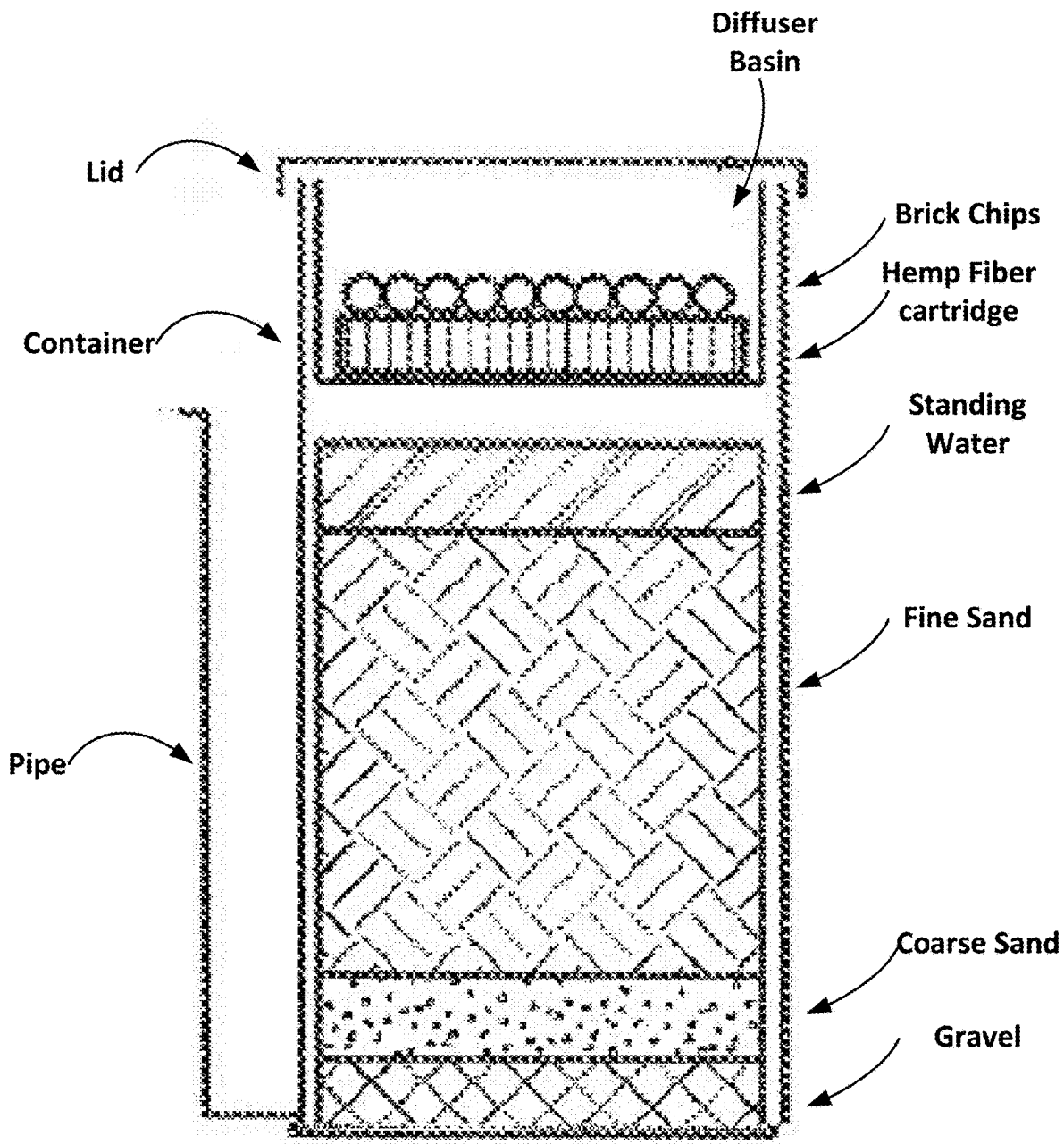
FIG. 1 is a schematic of a particular embodiment of the present invention.

It is an object of certain embodiments of the present invention to provide methods of reducing PFAS in contaminated water.

It is an object of certain embodiments of the present invention to provide a system for reducing PFAS in contaminated water.

At least one of these objects and potentially others may be met by the present invention which in certain embodiments is directed to a process for decontaminating water to remove per- and polyfluoroalkyl substances (PFAS), the process comprising passing contaminated water through a filter comprising at least one filtering element, wherein the filtering element comprises organic fibers; wherein the decontaminated water has a PFAS level of less than 70 ppt.

Another embodiment of the present invention is directed to a system to perform a process for decontaminating water to remove per- and polyfluoroalkyl substances (PFAS), the process comprising passing contaminated water through a filter comprising at least one filtering element, wherein the filtering element comprises organic fibers; wherein the decontaminated water has a PFAS level of less than 70 ppt.

DETAILED DESCRIPTION

Certain embodiments of the present invention are directed to a process for decontaminating water to remove per- and polyfluoroalkyl substances (PFAS), the process comprising passing contaminated water through a filter comprising at least one filtering element, wherein the filtering element comprises organic fibers; wherein the decontaminated water has a PFAS level of less than 70 ppt.

In certain embodiments, the organic fibers comprise hemp, e.g., *Cannabis sativa*.

Subspecies of *Cannabis sativa* that can be utilized in certain embodiments of the present invention may include one or more of
  a) Kingdom: Plantae—plantes, Planta, Vegetal, plants
  b) Subkingdom: Viridiplantae—green plants
  c) Infrakingdom: Streptophyta—land plants
  d) Super division: Embryophyta
  e) Division: Tracheophyta—vascular plants, tracheophytes
  f) Subdivision: Spermatophytina—spermatophytes, seed plants, phanerogames
  g) Class: Magnoliopsida
  h) Superorder: Rosanae
  i) Order Rosales
  j) Family: Cannabaceae—hemp
  k) Genus *Cannabis* L.—hemp
  l) Species: *Cannabis sativa* L.—hemp, grass, hashish, Mary Jane, pot, marijuana a. Direct Children:
  m) Subspecies *Cannabis sativa* ssp. indica (Lam.) E. Small & Cronquist—hemp, grass, hashish, Mary Jane, pot, marijuana
  n) Subspecies *Cannabis sativa* ssp. sativa L.—hemp, grass, hashish, Mary Jane, pot, marijuana In certain embodiments, the organic fibers are a *sativa-indica* hybrid.

In certain embodiments, the fibers comprise a *Cannabis sativa* strain selected from one or more of Sour Diesel (tetrahydrocannabinol (THC): 17 to 26 percent, cannabidiol (CBD): <1 percent), Jack Herer (THC: 15 to 24 percent, CBD: <1 percent), Green Crack (TIC: 15 to 25 percent, C3D: <1 percent), Chocolope (TIC: 16 to 23 percent, CBD: <1 percent), Super Silver Haze (THC: 18 to 23 percent, CBD: <1 percent), Durban Poison (TIC: 17 to 26 percent, CBD: <1 percent), Strawberry Cough (THC: 17 to 23 percent, CBD: <1 percent), Harlequin GDP (THC: 10 to 11 percent, CBD: 3 to 7 percent), Super Lemon I-laze (THC: 18 to 25 percent, CBD: <1 percent), Lucid Blue (THC: 16 to 28 percent, CBD: 0 to 4 percent), Sour Breath (THC: 15 to 17 percent, CBD: <1 percent), Red Congolese (THC: 18 to 23 percent, CBD: <1 percent).

In certain embodiments, the hemp utilized in the present invention comprises the root, e.g., greater than 50% w/w, greater than 75% w/w, greater than 90% w/w or greater than 99% w/w or 100%. In certain embodiments, the hemp, e.g., the root is pretreated with a basic environment, e.g., a metal hydroxide solution such as sodium hydroxide or potassium hydroxide. The solution can be, e.g., a 0.5 to 5, or 0.1 Molar and the treatment can be, e.g., for a time, of 5 minutes to about 6 hours or 30 minutes to 2 hours or about 1 hour.

The pH of the pretreatment or the decontamination can be, e.g., about 3 to about 6 or about 4 to about 5.

In certain embodiments, the hemp can be in powder form.

In certain embodiments, the hemp may be preprocessed according to one of the following procedures.

Protein Purification A:
1. Freeze Hemp in −80° C. in liquid nitrogen.
2. Use Mortar to grind hemp into a powder.
3. Store Hemp at −80° C. until isolation.
4. Suspend hemp in 0.5M NaCL solution for 1 hour.
5. Solution should be stored at 24° C. and stirred continuously.
6. Centrifuge (7000 g, 1 hour at 4° C.).
7. Supernatant clarified with Whatman No 1 filter.
8. Discard precipitate.
9. Dialyze for 5 days using tubing.
10. Centrifuge content for 1 hour at 4° C. (7000 g).
11. Supernatant collected as albumin.
12. Freeze dry then store at −20° C. until further analysis.

Protein Purification B:
1. Freeze Hemp in −80° C. in liquid nitrogen
2. Use Mortar to grind hemp into a powder.
3. Store Hemp at −80° C. until isolation
4. Suspend hemp in CTAB buffer
5. 0.5M NaCl solution for 1 hour at 24° C. with continuous stirring
6. Centrifuge (7000 g, 1 hour at 4° C.)
7. Supernatant clarified with Whatman No 1 filter
8. Discard precipitate
9. Dialyze for 5 days using tubing
10. Centrifuge content for 1 hour at 4° C. (7000 g)
11. Supernatant collected as albumin SDS-PAGE:
1. Suspend freeze dried albumin sample in Tris/HCL buffer (ratio 10 mg/1 mL).
2. Heat solution to 95° C. for 10 minutes.
3. Cool the solution.
4. Centrifuge (10,000 g, 15 minutes).
5. Load 1 μL of supernatant onto the gel.
6. Load the protein ladder onto the gel.
7. Run the gel according to directions of the gel/protein ladder.

In certain embodiments, the decontaminated water has a PFAS level of less than 60 ppt, less than 50 ppt, less than 40 ppt, less than 30 ppt, less than 20 ppt, less than 15 ppt, less than 10 ppt, less than 5 ppt or is undetectable.

In certain embodiments, the PFAS comprise C3eC9 perfluoroalkyl carboxylic acids (PFCAs).

In certain embodiments, the PFCAs are selected from at least one of PFBA, PFPeA, PFHxA, PFHpA, PFOA, PFNA and PFDA.

In certain embodiments, the decontaminated water has a PFNA level of less than 10.5 ppt, less than 8 ppt, less than 5 ppt, less than 1 ppt or 0 ppt.

In certain embodiments, the decontaminated water has a PFOA level of less than 70 ppt, less than 50 ppt, less than 25 ppt, less than 15 ppt less than 11 ppt, less than 8 ppt, less than 5 ppt, less than 1 ppt or 0 ppt.

The process of any preceding claim, wherein the PFAS comprise at least one of a C4, C6, C8 perfluoroalkyl sulfonic acid (PFSAs).

In certain embodiments, the PFSAs are selected from at least one of PFBS, PFHxS and PFOS.

In certain embodiments, the decontaminated water has a PFOS level of less than 70 ppt, less than 50 ppt, less than 25 ppt, less than 15 ppt, less than 7 ppt or less than 5 ppt.

In certain embodiments, the decontaminated water has a PFHxS level of less than 70 ppt, less than 50 ppt, less than 25 ppt, less than 15 ppt less than 11 ppt, less than 8 ppt, less than 5 ppt, less than 1 ppt or 0 ppt.

In certain embodiments, the PFAS comprise 6:2 fluorotelomer sulfonic acid (6:2 FTSA).

In certain embodiments, the PFAS testing is conducted using a solid phase extraction (SPE) liquid chromatography/tandem mass spectrometry (LC/MS/MS) method.

In certain embodiments, the PFAS testing is conducted using US EPA Method 537.1, hereby incorporated by reference.

In certain embodiments, there is a plurality of filtering elements.

In certain embodiments, the plurality of filtering elements are arranged in individual layers.

In certain embodiments, each individual layer comprises one or more of hemp fibers, brick chips, charcoal, activated charcoal, agave fibers, jute fibers, sand, filter paper and gravel.

In certain embodiments, the plurality of filtering elements are contained within a filtering unit.

In certain embodiments, the filtering unit comprises a diffuser.

In certain embodiments, the diffuser comprises a first layer of brick chips and a second layer comprising hemp.

In certain embodiments, the second layer further comprises charcoal or activated charcoal.

In certain embodiments, the ratio of the thickness of the first layer to the second layer ranges from about 1:5 to 1:2.

In certain embodiments, the second layer is at least three times thicker than the first layer.

In certain embodiments, the contaminated water is well water.

In certain embodiments, the well water is filtered in a pump and treat method.

In certain embodiments, the contaminated water has PFAS in an amount of greater than 5 ppt, greater than 10 ppt, greater than 20 ppt, greater than 30 ppt, greater than 100 ppt, greater than 200 ppt, greater than 500 ppt or greater than 1000 ppt.

In certain embodiments, the flow rate is from about 0.1 liter/hour to about 100 liter/hour or about 20 liter/hour to about 40 liter/hour.

In certain embodiments, the residence time is from about 5 minutes to about 6 hours or about 30 minutes to about 90 minutes.

In certain embodiments, the pressure is from about 1 ATM to about 5 ATM.

In certain embodiments, the filtration rate is from about 0.1 gallons/minute per square foot to about 100 gallons/minute per square foot or about 2 gallons/minute per square foot to about 10 gallons/minute per square foot.

In certain embodiments, the process is subject to a continuous flow, e.g., with a plug flow reactor.

In certain embodiments, the diffuser comprises a first layer comprising charcoal or activated charcoal and a second layer comprising hemp.

In certain embodiments, each layer can be changed independently.

In certain embodiments, charcoal or activated charcoal and hemp are not mixed.

In certain embodiments, the filtering unit is changed at an interval of from about 1 month to about 12 months, or about 2 months to about 8 months or about 3 months to about 6 months or about 3 to about 4 months.

In certain embodiments, the process is conducted on drinking water.

In certain embodiments, the drinking water is processed at an individual faucet.

In certain embodiments, the drinking water is processed at a building connection.

In certain embodiments, the hemp fibers are obtained by removing the husk from the stem to leave the fibers. In certain embodiments, the hemp fibers utilized in the present invention have an initial width of about 1 µm to about 5000 µm or about 10 µm to 3000 µm or about 23 µm to 2000 µm or about 5 µm to about 40 µm or about 10 µm to about 100 µm, about 1 µm to about 50 µm or about 1 µm to about 200 µm. In certain embodiments, the fibers are combed through with e.g., a quadruple row hackling comb to reduce the width, e.g., to about 20 µm to about 200 µm or about 50 µm and in certain embodiments with no fiber more than 200 µm. Hackling combs are traditionally a metal plate with rows of needles used to prepare other natural fibers such as flax for spinning. Three variations of the hackles are created with smaller nails that are closer together. In certain embodiments, these values are mean values.

In certain embodiments, the dried fibers are placed into solution containing, e.g., 1 wt. % to 10 wt. % or 2 wt. % Ca(OH)$_2$ e.g., for one day to 7 days or 3 days and are then cut into, e.g., 1 mm to about 100 mm or about 5 mm to about 50 mm or about 15 mm to about 25 mm or about 20 mm length. In certain embodiments, these values are mean values.

In certain embodiments, the process is conducted on grey water.

In certain embodiments, the process excludes activated charcoal.

In certain embodiments, the process is conducted to equalize a basin or tank.

In certain embodiments, the contaminated water is found in a lagoon, aerobic lagoon, aerated lagoon, lake, stream, quarry or mine.

In certain embodiments, the invention is directed to a process for decontaminating water to remove per- and polyfluoroalkyl substances (PFAS), the process comprising passing contaminated water having a PFAS level of at least 500 ppt through a filter comprising at least one filtering element, wherein the filtering element comprises organic fibers; wherein the decontaminated water has a PFAS level of less than 100 ppt.

In certain embodiments, the invention is directed to a process for decontaminating water to remove per- and polyfluoroalkyl substances (PFAS), the process comprising passing contaminated water having a PFAS level of at least 30 ppt through a filter comprising at least one filtering element, wherein the filtering element comprises organic fibers; wherein the decontaminated water has a PFAS level of less than 15 ppt.

In alternative embodiments, the process of the present invention is directed to PFAS decontamination as well as decontamination of PFAS compounds, e.g., conjugates comprising PFAS.

In certain embodiments, the invention is directed to a system or apparatus for performing one or more of the processes of the present invention.

In certain embodiments, the present invention is directed to a process for decontaminating water to remove per- and polyfluoroalkyl substances (PFAS), the process comprising passing contaminated water having a PFAS level of at least 30 ppt through a filter comprising at least one filtering element, wherein the filtering element comprises *Cannabis sativa* fibers; wherein the flow rate is from about 0.1 liter/hour to about 100 liter/hour; wherein the residence time is from about 5 minutes to about 6 hours; wherein the pressure is from about 1 ATM to about 5 ATM; wherein the filtration rate is from about 0.1 gallons/minute per square foot to about 100 gallons/minute per square foot; and wherein the decontaminated water has a PFAS level of less than 10 ppt.

In other embodiments, the invention is directed to a process for decontaminating water to remove per- and polyfluoroalkyl substances (PFAS), the process comprising passing contaminated water having a PFAS level of at least 30 ppt through a filter comprising at least two filtering element, wherein the one filtering element comprises *Cannabis sativa* fibers and another filtering element comprises activated charcoal; wherein the flow rate is from about 10 liter/hour to about 40 liter/hour; wherein the residence time is from about 30 minutes to about 90 minutes; wherein the pressure is about 1 ATM; wherein the filtration rate is from about 2 gallons/minute per square foot to about 10 gallons/minute per square foot; and wherein the decontaminated water has a PFAS level of less than 10 ppt.

The term "filtering element" as used herein refers to a filter medium that can have a complex structure and can separate solid matter and fluid from a liquid mixture that passes through it.

Figure 2:
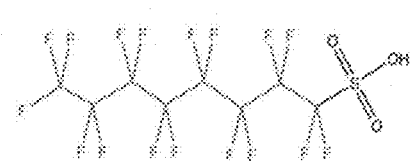
FIG. 2 is a depiction of chemical structures of certain PFASs.
Figure 2:
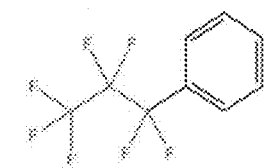
Figure 2:
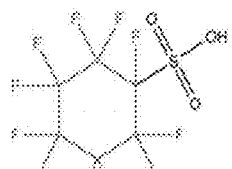
Figure 2:
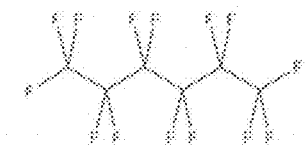
Figure 2:
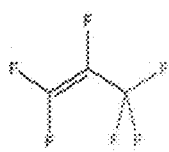
Figure 2:
Figure 2:
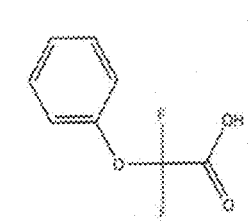
Figure 2:
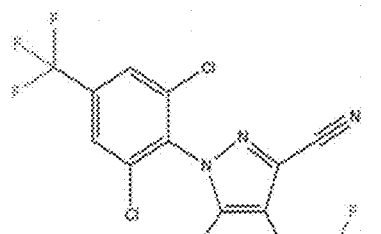
Figure 2:
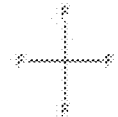
Figure 2:
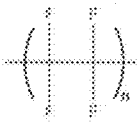
Figure 2:
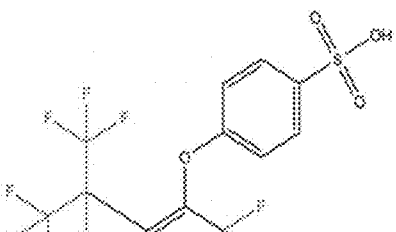
Figure 2:
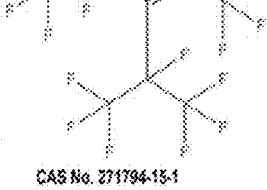
Figure 2:
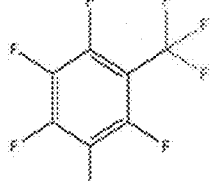
Figure 2:
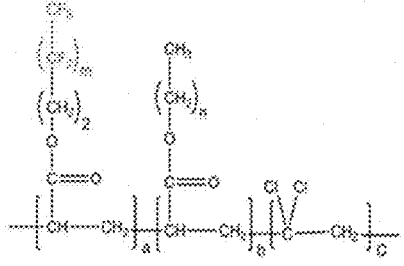
Figure 2:
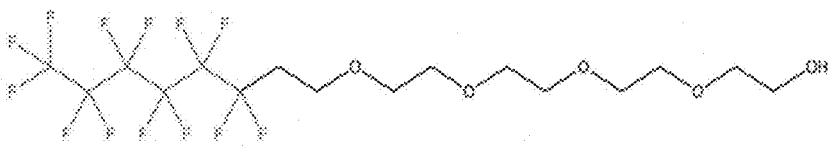

PFAS is defined as (i) substances and compounds where a perfluorocarbon chain is connected with functional groups on both ends, (ii) aromatic substances and compounds that have perfluoroalkyl moieties on the side chains, and (iii) fluorinated cycloaliphatic substances and compounds. Examples of PFASs are in FIG. 2 with fully fluorinated methyl or methylene carbon atoms.

Perfluoroalkyl substances are fully fluorinated (perfluoro-) alkane (carbon-chain) molecules. Their basic chemical structure is a chain (or tail) of two or more carbon atoms with a charged functional group head attached at one end. The functional groups commonly are carboxylates or sulfonates, but other forms are also detected in the environment. Fluorine atoms are attached to all possible bonding sites along the carbon chain of the tail, except for one bonding site on the last carbon where the functional group head is attached.

Polyfluoroalkyl substances are distinguished from perfluoroalkyl substances by not being fully fluorinated. Instead, they have a non-fluorine atom (typically hydrogen or oxygen) attached to at least one, but not all, carbon atoms, while at least two or more of the remaining carbon atoms in the carbon chain tail are fully fluorinated. Nn-fluorine atom attracted to carbon atom create a weak point in a carbon chain susceptible to biotic or abiotic degradation. In addition, some of these substances may degrade to create perfluoroalkyl substances are referred to as "precursors".

PFAS can be polymers and nonpolymers. Polymers are large molecules formed by bonding many identical smaller molecules (each of those part called monomer) in a repeating pattern. Some these polymers i.e., side-chain fluorinated polymers that contains longest continuous chain of atoms bonded to each other (backbone) may degrade to PFAA (non-polymer PFAS).

Nonpolymer PFAS are the PFAS most detected in humans, ecosystems, and other environmental media and include compounds such as perfluorooctanoic acid (PFOA) and perfluorooctanesulfonate (PFOS), which are 2 of the substances in Perfluoroalkyl acids (PFAAs) group.

PFASs include fully (per) or partly (poly) fluorinated carbon chain connected to different functional groups. Based on the length of the fluorinated carbon chain, therefore, PFASs are frequently referred to as "long-chain" or "short-chain."

Long chains refer to: (1) perfluorocarboxylic acids (PFCAs) with carbon chain lengths C8 and higher, including perfluorooctanoic acid (PFOA); (2) perfluoroalkane sulfonic acids (PFSAs) with carbon chain lengths C6 and higher, including perfluorohexane sulfonic acid (PFHxS) and perfluorooctane sulfonate (PFOS); (3) precursors of these substances that may be produced or present in products.

While Short chain PFAS are perfluoroalkyl carboxylic acids with seven or fewer carbons (six or fewer carbons are perfluorinated) and perfluoroalkane sulfonates with five or fewer carbons (five or fewer carbons are perfluorinated).

U.S. Pat. No. 11,413,558 and U.S. 62/772,307 are hereby incorporated by reference in their entireties of all purposes.

The following references are hereby incorporated by reference in their entireties of all purposes.

Turner et al., Novel remediation of per- and polyfluoroalkyl substances (PFASs) from contaminated groundwater using *Cannabis Sativa* L. (hemp) protein powder, Chemosphere, Volume 229, August 2019.

Ahrens, L., 2011. Polyfluoroalkyl compounds in the aquatic environment: a review of their occurrence and fate. J. Environ. Monit. 13 (1), 20e31.

Backe W J, Day T C, Field J A. Zwitterionic, cationic, and anionic fluorinated chemicals in aqueous film forming foam formulations and groundwater from U.S. military bases by nonaqueous large-volume injection HPLC-MS/MS. Environ Sci Technol. 2013 May 21;47(10):5226-34. doi: 10.1021/es3034999. Epub 2013 May 1. PMID: 23590254.

Buck, R. C., Franklin, J., Berger, U., Conder, J. M., Cousins, IT., de Voogt, P., Jensen, A. A., Kannan, K., Mabury, S. A., van Leeuwen, S. P., 2011. Perfluoroalkyl and polyfluoroalkyl substances in the environment: Terminology, classification, and origins. Integrated Environ. Assess. Manag. 7, 513e541.

Appleman, T. D., Higgins, C. P., Qui~nones, O., Vanderford, B. J., Kolstad, C., Zeigler-Holady, J. C., Dickenson, E. R., 2014. Treatment of poly- and perfluoroalkyl substances in U.S. full-scale water treatment systems. Water Res. 51, 246e255.

Biegel-Engler, A., Vierke, L., Apel, P., Fetter, E., Staude, C., 2017. Mitteilungen des Umweltbundesamtes zu per- und polyfluorierten Chemikalien (PFC) in Trinkwasser (in German). Bundesgesundheitsblatt 60, 341e346.

Lindstrom, A. B., Strynar, M. J., Libelo, E. L., 2011. Polyfluorinated compounds: past, present, and future. Environ. Sci. Technol. 45, 7954e7961.

Knutsen, H., Alexander, J., Barregird, L., Bignami, M., Bruschweiler, B., Ceccatelli, S., Cottrill, B., Dinovi, M., Edler, L., Grasl-Kraupp, B., et al., 2018. Risk to human health related to the presence of perfluorooctane sulfonic acid and perfluorooctanoic acid in food. EFSA journal 12.

Post, G. B., Cohn, P. D., Cooper, K. R., jul, 2012. Perfluorooctanoic acid (PFOA), an emerging drinking water contaminant: a critical review of recent literature. Environ. Res. 116, 93e117.

Rahman, M. F., Peldszus, S., Anderson, W. B., 2014. Behaviour and fate of perfluoroalkyl and polyfluoroalkyl substances (PFASs) in drinking water treatment: a review. Water Res. 50, 18e340.

Vecitis, C. D., Park, H., Cheng, J., Mader, B. T., Hoffmann, M. R., 2009. Treatment technologies for aqueous perfluorooctanesulfonate (PFOS) and perfluorooctanoate (PFOA). Front. Environ. Sci. Eng. China 3, 129e151

Carter, K. E., Farrell, J., mar, 2010. Removal of perfluorooctane and perfluorobutane sulfonate from water via carbon adsorption and ion exchange. Separ. Sci. Technol. 45, 762e767.

Eschauzier, C., Beerendonk, E., Scholte-Veenendaal, P., Voogt, P. D., 2012. Impact of treatment processes on the removal of perfluoroalkyl acids from the drinking water production chain. Environ. Sci. Technol. 46, 1708e1715.

Flores, C., Ventura, F., Martin-Alonso, J., Caixach, J., 2013. Occurrence of perfluorooctane sulfonate (PFOS) and perfluorooctanoate (PFOA) in n.e. Spanish surface waters and their removal in a drinking water treatment plant that combines conventional and advanced treatments in parallel lines. Sci. Total Environ. 461e462, 618e626.

Chularueangaksorn, P., Tanaka, S., Fujii, S., Kunacheva, C., 2014. Adsorption of perfluorooctanoic acid (PFOA) onto anion exchange resin, non-ion exchange resin, and granular-activated carbon by batch and column. Desalination and Water Treatment 52, 6542e6548. https://doi.org/10.1080/19443994.2013.815589.

Zhang, S., Lu, X., Wang, N., Buck, R. C., 2016b. Biotransformation potential of 6:2 fluorotelomer sulfonate (6:2 FTSA) in aerobic and anaerobic sediment. Chemosphere 154, 224e230.

Zaggia, A., Conte, L., Falletti, L., Fant, M., Chiorboli, A., 2016. Use of strong anion exchange resins for the removal of perfluoroalkylated substances from contaminated drinking water in batch and continuous pilot plants. Water Res. 91, 137e146.

Franke, V., McCleaf, P., Lindegren, K., Ahrens, L., 2019. Efficient removal of per- and polyfluoroalkyl substances (PFASs) in drinking water treatment: nanofiltration combined with active carbon or anion exchange. Environ. Sci.: Water Res. Technol. 5, 1836e1843.

Merino, N., Qu, Y., Deeb, R. A., Hawley, E. L., Hoffmann, M. R., Mahendra, S., 2016. Degradation and removal methods for perfluoroalkyl and polyfluoroalkyl substances in water. Environ. Eng. Sci. 33, 615e649.

Crittenden, J. C., Trussell, R. R., Hand, D. W., Howe, K. J., Tchobanoglous, G., 2012. MWH's Water Treatment: Principles and Design, third ed. John Wiley & Sons, Inc.

McCleaf, P., Englund, S., €Ostlund, A., Lindegrena, K., Wiberg, K., Ahrens, L., 2017. Removal efficiency of multiple poly- and perfluoroalkyl substances (PFASs) in drinking water using granular activated carbon (GAC) and anion exchange (AE) column tests. Water Res. 120, 77e87.

Takagi, S., Adachi, F., Miyano, K., Koizumi, Y., Tanaka, H., Watanabe, I., Tanabe, S., Kannan, K., jul, 2011. Fate of perfluorooctanesulfonate and perfluorooctanoate in drinking water treatment processes. Water Res. 45, 3925e3932.

Gyllenhammar, I., Berger, U., Sundstr€om, M., McCleaf, P., Eur_en, K., Eriksson, S., Ahlgren, S., Lignell, S., Aune, M., Kotova, N., Glynn, A., 2015. Influence of contaminated drinking water on perfluoroalkyl acid levels in human serum a case study from uppsala, Sweden. Environ. Res. 140, 673e683.

Ericson, I., Domingo, J. L., Nadal, M., Bigas, E., Llebaria, X., van Bavel, B., Lindstr€om, G., 2009. Levels of perfluorinated chemicals in municipal drinking water from catalonia, Spain: public health implications. Arch. Environ. Contam. Toxicol. 57, 631e638.

Post, G. B., Louis, J. B., Cooper, K. R., Boros-Russo, B. J., Lippincott, R. L., 2009. Occurrence and potential significance of perfluorooctanoic acid (PFOA) detected in New Jersey public drinking water systems. Environ. Sci. Technol. 43, 4547e4554.

Ullah, S., Alsberg, T., Berger, U., 2011. Simultaneous determination of perfluoroalkyl phosphonates, carboxylates, and sulfonates in drinking water. J. Chromatogr. A 1218, 6388e6395.

USEPA, 2016. Drinking Water Health Advisories for PFOA and PFOS. (Accessed January 2017).

Ankarberg, E. H., Lindberg, T., 2016. Riskhanteringsrapport-Risker vid f€ororening av dricksvatten med PFAS. Tech. rep., Livsmedelverket. 3 (7).

EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Materials and Methods

The source of water for testing for PFAS was obtained from 3 locations: 1) Control: De-ionized water obtained from reverse osmosis; 2) City of Boston: Tap water; and 3) Water from a known source of PFAS contamination.

The organic fibers were obtained from an online source as shown. The organic fibers were processed by removing the large clumps and straightening the fibers.

PFAS Testing

The PFAS testing was conducted using method 537 version.

US EPA Method 537.1 is a solid phase extraction (SPE) liquid chromatography/tandem mass spectrometry (LC/MS/MS) method for the analysis of 18 selected PFAS, including PFOS and PFOA, in drinking water. Multiple Reaction Monitoring (MRM) is used to enhance selectivity, and quantification relies on internal standard correction.

Results and Discussion

The table below shows initial results.

TABLE I

REGULATIONS FOR PFAS BY ATSDR AND USEPA

|  | Current State Regulations | Agency for Toxic Substances Disease Registry Report (Proposed) |
|---|---|---|
| PFOS (Perflurooctane Sulfonic acid) | 70 ppt | 7 ppt |
| PFNA (Perflurononoic acid) | N/A | 10.5 ppt |
| PFOA | 70 ppt | 11 ppt |
| PFHxS | N/A | 70 ppt |

TABLE II

RESULTS OF PFAS TESTING

| Contaminant | ATSDR Regulations | Initial Concentration | Final Concentration |
|---|---|---|---|
| PFOS | 7 ppt | 15 ppt | 3.9 ppt |
| PFNA | 10.5 ppt | 5 ppt | 0 ppt |
| PFOA | 11 ppt | 15 ppt | 0 ppt |
| PFHxS | 70 ppt | 15 ppt | 0 ppt |

The reduction of PFAS is attributed, e.g., to the binding forces which are found in the proteins of the organic fiber. Proteins, as biomacromolecules, have cavities and surfaces which give rise to hydrophobic forces, electrostatic interactions, hydrogen bonding, Van der Waals forces etc. all of which are encompassed by the terms physisorption or chemisorption. Further testing is required to determine the mechanisms of the PFAS removal by the organic fiber.

Further Example

Materials and Methods
Sampling

The source of water for testing for PFAS was obtained from the city of Boston Tap Water and spiked with 15 ng/l of analyte. The filtered samples were then stored in 1-L amber Nalgene™ bottle with no preservative or dechlorination agent was used. Samples were packed on ice and shipped overnight to the Con-test Pace Analytical laboratory in East Longmeadow Massachusetts, LC-MS, for analysis using EPA 537.1 method. The PFAS testing was conducted using method US EPA Method 537.1 is a solid phase extraction (SPE) liquid chromatography/tandem mass spectrometry (LC/MS/MS) method for the analysis of 19 selected PFAS, including PFOS and PFOA, in drinking water. Multiple Reaction Monitoring (MRM) is used to enhance selectivity, and quantification relies on internal standard correction. Within 8 hours of arrival, 5 g of Trizma pre-set crystals (Fisher Scientific), pH 7.0, was added to each sample, the caps replaced, and the bottles shaken to mix the sample. Citric acid monohydrate (Fisher Scientific) and sodium citrate dihydrate (Fisher Scientific), 1 g each, were added to each sample, caps replaced, and the bottles shaken. The samples were stored at room temperature and extracted within 5 days of sampling. Extracted samples were archived in freezers.

Filter Construction

The organic fibers (Cannabis sativa) were processed by removing the large clumps and straightening the fibers.

Results and Discussion

PFAS Testing QA/QC

This project used a strict quality assurance/quality control (QA/QC) protocol to characterize data variability (Glassmeyer et al., 2017; Batt et al., 2017). Every sample in the study was collected in triplicate. The first was the primary sample, the analytical results from which are the basis of this paper. The second sample was analyzed as a duplicate, to monitor variability within co-collected samples as well as the method. The third was a laboratory fortified matrix (LFM) sample; this matrix spike sample served to monitor for any matrix-induced signal enhancement or suppression that could occur. The source water samples were spiked at 15 ng/L of each analyte, the treated drinking water with 1 ng/L of each analyte. Any sample with a laboratory fortified matrix recovery >150% after accounting for any detections in the primary sample was deemed to be experiencing matrix enhancement, and the associated primary sample result was considered to be a qualitative detection (i.e. considered a detection, but no quantitative concentration was reported). The lowest concentration minimal reporting level (LCMRL; USEPA, 2010) process was used to set minimum reporting levels. Any detection above the instrument reporting level (lowest calibration concentration of the curve) but below the LCRML was also considered a qualitative detection. For the remainder of the text, when discussing "qualitative frequencies of detection" the data referred to combine both qualitative and quantitative detections, while "quantitative frequency of detection" includes only the measurements reported numerically. A field blank sample consisting of laboratory grade water poured into the sample bottle by the field personnelwas collected alongside all source and treated drinking water samples. The concentration in the primary sample had to exceed any detections in the field blank or any associated laboratory blank by a factor of three to be considered a valid detection; those sample results with concentrations that were less than three times the field blank were treated as non-detects. Laboratory blank samples and laboratory fortified blank samples (LFBs; prepared by spiking a laboratory water with 1 ng/L (or 15 ng/L) of each PFAS analyte), also were analyzed with each batch of samples to monitor analytical performance. An extraction batch included the six samples described above (primary, duplicate, LFM, field blank, lab blank, and LFB); the analytical batch also included concentration check and spike check samples that are not extracted but are analyzed along with the extracted samples.

PFAS Detections and Concentrations

Of the 19 PFAS tested in this study, for the filtered water samples only 2 were qualitatively and quantitatively detected but was below the current drinking water permissible limits. Table 1 and 2 provides a synopsis of the detections and measured concentrations; data for all analytes. In May 2016, the USEPA established a non-regulatory lifetime health advisory (LHA) for two of these chemicals; PFOS and PFOA. The LHA for PFOS and PFOA is 70 ppt combined, or individually if only one of the chemical is present. Most States in the US has adopted the 70 ppt combined limit as well. However a few States and regulatory institutions are recommending lower limits. The Agency for Toxic Substances Disease Registry Report (ATSDR) has proposed lower limits as shown in the table above.

TABLE 1

Results of PFAS Testing Trial 1

Filtered Drinking Water Trail 1

| Number | Analyte | 1st Flush | 2nd Flush | RL | Units | Dilution | Method |
|---|---|---|---|---|---|---|---|
| 1 | Perfluorobutanesulfonic acid (PFBS) | ND | ND | 2 | ng/L | 1 | EPA 537.1 |
| 2 | Perfluorohexanoic acid (PFHxA) | ND | ND | 2 | ng/L | 1 | EPA 537.1 |
| 3 | Perfluorohexanesulfonic acid (PFHxS) | ND | 2 | 2 | ng/L | 1 | EPA 537.1 |
| 4 | Perfluoroheptanoic acid (PFHpA) | 3.7 | ND | 2 | ng/L | 1 | EPA 537.1 |
| 5 | Perfluorooctanoic acid (PFOA) | ND | ND | 2 | ng/L | 1 | EPA 537.1 |
| 6 | Perfluorooctanesulfonic acid (PFOS) | ND | ND | 2 | ng/L | 1 | EPA 537.1 |
| 7 | Perfluorononanoic acid (PFNA) | ND | ND | 2 | ng/L | 1 | EPA 537.1 |
| 8 | Perfluorodecanoic acid (PFDA) | ND | ND | 2 | ng/L | 1 | EPA 537.1 |
| 9 | N-EtFOSAA | ND | ND | 2 | ng/L | 1 | EPA 537.1 |
| 10 | Perfluoroundecanoic acid (PFUnA) | ND | ND | 2 | ng/L | 1 | EPA 537.11 |
| 11 | N-MeFOSAA | ND | ND | 2 | ng/L | 1 | EPA 537.1 |
| 12 | Perfluorododecanoic acid (PFDoA) | ND | ND | 2 | ng/L | 1 | EPA 537.1 |
| 13 | Perfluorotridecanoic acid (PFTrDA) | ND | ND | 2 | ng/L | 1 | EPA 537.1 |
| 14 | Perfluorotetradecanoic acid (PFTA) | ND | ND | 2 | ng/L | 1 | EPA 537.1 |
| 15 | Hexafluoropropylene oxide dimer acid | ND | ND | 2 | ng/L | 1 | EPA 537.1 |
| 16 | (HFPO-DA) | ND | ND | 2 | ng/L | 1 | EPA 537.1 |
| 17 | 11Cl-PF3OUdS (F53B Major) | ND | ND | 2 | ng/L | 1 | EPA 537.1 |
| 18 | 9Cl-PF3ONS (F53B Minor) | ND | ND | 2 | ng/L | 1 | EPA 537.1 |
| 19 | 4,8-dioxa-3H-perfluorononanoic acid (ADONA) | ND | ND | 2 | ng/L | 1 | EPA 537.1 |

The surrogates percent recovery for 13C-PFHxA was 77.7%, M3HFPO-DA was 70.5%, 13C-PFDA was 94.900 and D5-NEtFOSAA was 69.8% with recovery limits for all at 70-130. The filtered samples in trial 1 indicated that the filter for extremely efficient in the removing all the analytes to non detect (ND) levels expect for Perfluoroheptanoic acid (PFHpA) and Perfluorohexanesulfonic acid (PFHxS) but both the values were far below permissible levels.

TABLE 2

Results of PFAS Testing Trial 2

Filtered Drinking Water Trail 2

| Number | Analyte | 1st Flush | 2nd Flush | RL | Units | Dilution | Method |
|---|---|---|---|---|---|---|---|
| 1 | Perfluorobutanesulfonic acid (PFBS) | ND | ND | 2 | ng/L | 1 | EPA 537.1 |
| 2 | Perfluorohexanoic acid (PFHxA) | ND | ND | 2 | ng/L | 1 | EPA 537.1 |
| 3 | Perfluorohexanesulfonic acid (PFHxS) | ND | 2.5 | 2 | ng/L | 1 | EPA 537.1 |
| 4 | Perfluoroheptanoic acid (PFHpA) | 3.5 | ND | 2 | ng/L | 1 | EPA 537.1 |
| 5 | Perfluorooctanoic acid (PFOA) | ND | ND | 2 | ng/L | 1 | EPA 537.1 |
| 6 | Perfluorooctanesulfonic acid (PFOS) | ND | ND | 2 | ng/L | 1 | EPA 537.1 |
| 7 | Perfluorononanoic acid (PFNA) | ND | ND | 2 | ng/L | 1 | EPA 537.1 |
| 8 | Perfluorodecanoic acid (PFDA) | ND | ND | 2 | ng/L | 1 | EPA 537.1 |
| 9 | N-EtFOSAA | ND | ND | 2 | ng/L | 1 | EPA 537.1 |
| 10 | Perfluoroundecanoic acid (PFUnA) | ND | ND | 2 | ng/L | 1 | EPA 537.11 |
| 11 | N-MeFOSAA | ND | ND | 2 | ng/L | 1 | EPA 537.1 |
| 12 | Perfluorododecanoic acid (PFDoA) | ND | ND | 2 | ng/L | 1 | EPA 537.1 |
| 13 | Perfluorotridecanoic acid (PFTrDA) | ND | ND | 2 | ng/L | 1 | EPA 537.1 |
| 14 | Perfluorotetradecanoic acid (PFTA) | ND | ND | 2 | ng/L | 1 | EPA 537.1 |
| 15 | Hexafluoropropylene oxide dimer acid | ND | ND | 2 | ng/L | 1 | EPA 537.1 |
| 16 | (HFPO-DA) | ND | ND | 2 | ng/L | 1 | EPA 537.1 |
| 17 | 11Cl-PF3OUdS (F53B Major) | ND | ND | 2 | ng/L | 1 | EPA 537.1 |
| 18 | 9Cl-PF3ONS (F53B Minor) | ND | ND | 2 | ng/L | 1 | EPA 537.1 |
| 19 | 4,8-dioxa-3H-perfluorononanoic acid (ADONA) | ND | ND | 2 | ng/L | 1 | EPA 537.1 |

CONCLUSIONS

The use of *Cannabis Sativa* fibers in a filter as a solution to PFAS remediation from contaminated water has been successfully demonstrated. The removal efficiency was >99% of the main contaminants of PFOS and PFHxS in less than 1 h of contact time.

The invention claimed is:

1. A process for decontaminating water to remove per- and polyfluoroalkyl substances (PFAS), the process comprising passing contaminated water having a PFAS level of at least 30 ppt through a filter comprising at least one filtering element, wherein the filtering element comprises *Cannabis sativa* fibers; wherein the flow rate is from about 0.1 liter/hour to about 100 liter/hour; wherein the residence time is from about 5 minutes to about 6 hours; wherein the pressure is from about 1 ATM to about 5 ATM; wherein the filtration rate is from about 0.1 gallons/minute per square foot to about 100 gallons/minute per square foot; and wherein the decontaminated water has a PFAS level of less than 10 ppt.

2. A process for decontaminating water to remove per- and polyfluoroalkyl substances (PFAS), the process comprising passing contaminated water having a PFAS level of at least 30 ppt through a filter comprising at least two filtering elements, wherein the one filtering element comprises *Cannabis sativa* fibers and another filtering element comprises activated charcoal; wherein the flow rate is from about 10 liter/hour to about 40 liter/hour; wherein the residence time is from about 30 minutes to about 90 minutes; wherein the pressure is about 1 ATM; wherein the filtration rate is from about 2 gallons/minute per square foot to about 10 gallons/minute per square foot; and wherein the decontaminated water has a PFAS level of less than 10 ppt.

* * * * *